May 22, 1962  O. BRINKMANN  3,035,798
PARACHUTE

Filed July 7, 1958  2 Sheets-Sheet 1

INVENTOR.
Otto Brinkmann
BY Mestern + Kollin

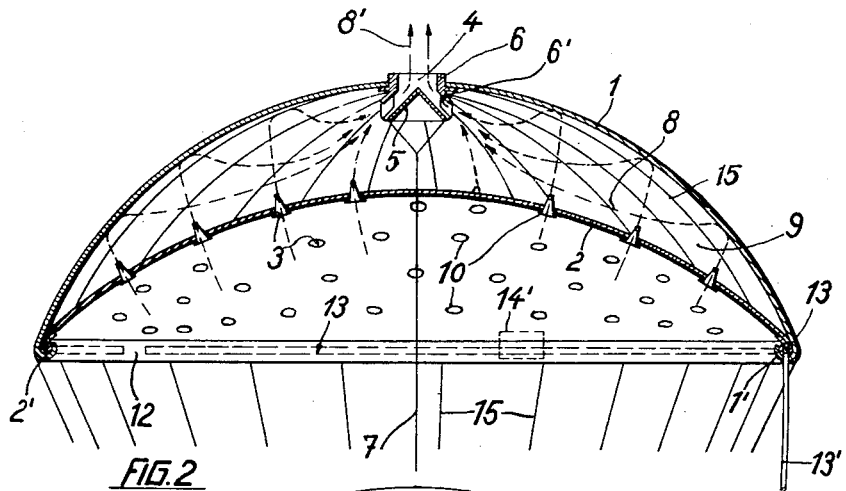
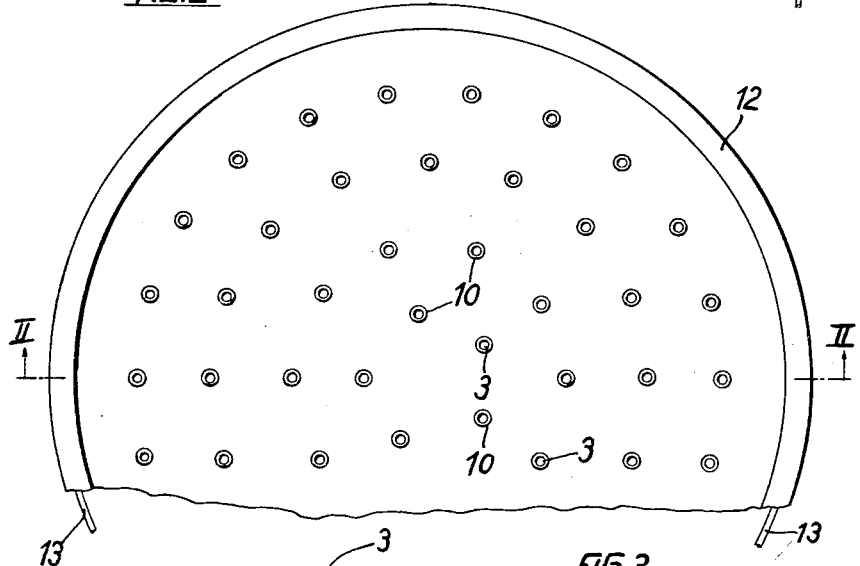
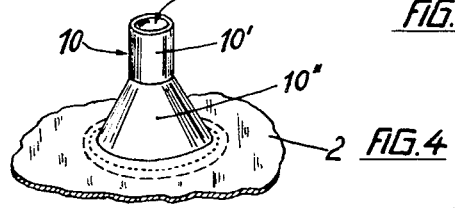

United States Patent Office 3,035,798
Patented May 22, 1962

3,035,798
PARACHUTE
Otto Brinkmann, Bonn, Germany, assignor to Helipara Gesellschaft mit beschrankter Haftung Luftfahrzeugbau, Bonn, Germany
Filed July 7, 1958, Ser. No. 746,692
Claims priority, application Germany July 6, 1957
7 Claims. (Cl. 244—145)

This invention relates to a parachute and has for an object to reduce the rate of fall of the unfolded (opened) parachute and to increase its stability. For this purpose the parachute consists of two canopies shaped as spherical caps of different radii, coaxially arranged, one above the other and tightly joined at their edges, The lower cap contains numerous nozzle shaped air inlets, while the upper cap has one considerably larger outlet, centrally situated.

Another object of the invention is to guarantee and to accelerate the opening of the parachute. For this purpose the edge of the parachute is equipped with an expanding device. If the parachute is used as a cargo parachute, the expanding device may be a tube adapted to be put under gas pressure.

A further object of the invention is the control of the rate of fall of the parachute. For this reason the central opening of the upper cap may be varied in such a way as to increase the effective air-flow cross section in order to obtain a reduced rate of fall.

The device according to the invention will now be more fully described with reference to the accompanying drawing, but it should be understood that the same is given merely by way of illustration and not of limitation and that many changes in the details may be made without departing from the spirit of the invention.

In the drawing,

FIG. 2 shows a vertical section through the parachute of FIG. 1 taken along the line II—II of FIG. 3;

FIG. 3 shows the lower spherical cap of the parachute, viewed from below; and

FIG. 4 shows one of the numerous nozzle-shaped inserts of the small air inlets of the lower cap.

Figure 1:
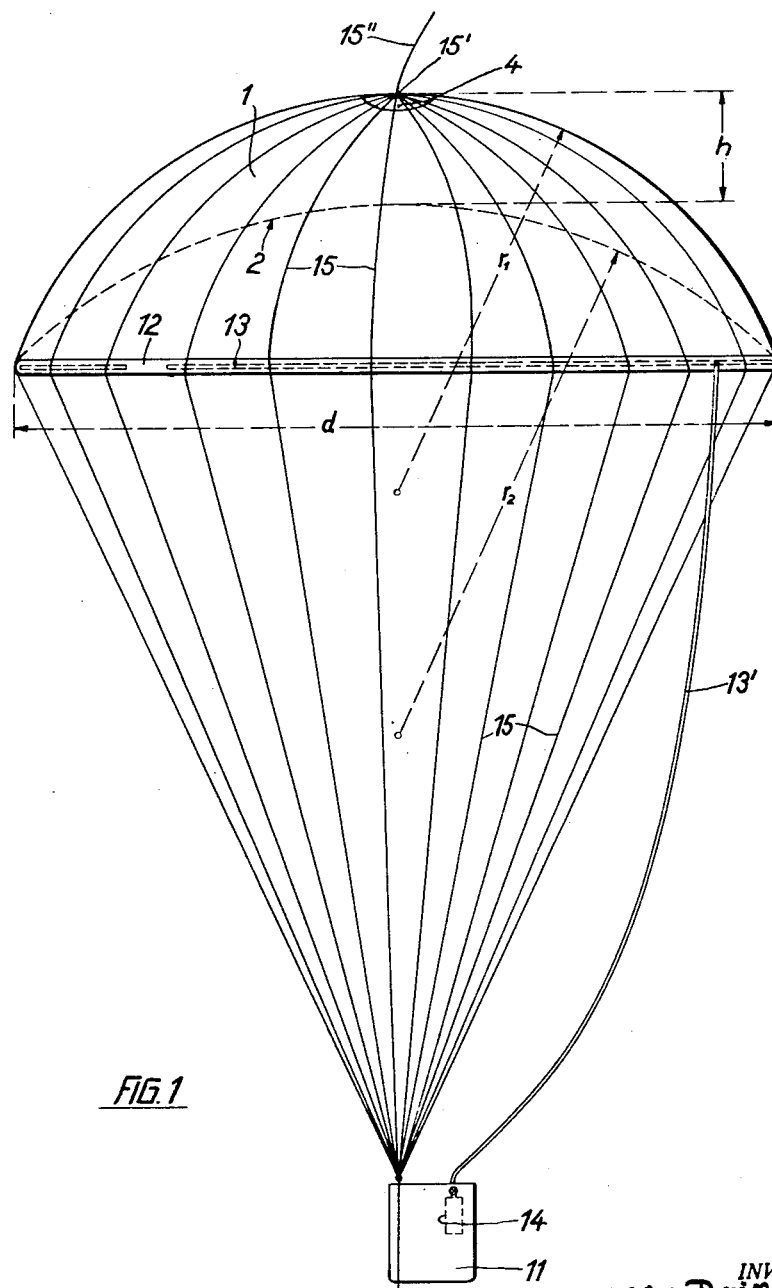
FIG. 1 shows a side elevation of a parachute according to the invention.

FIGURES 1 to 3 show the parachute consisting of two canopies formed by spherical caps 1 and 2, tightly connected at the edges 1' and 2'. The shroud lines 15 can be arranged in the usual manner and fastened to the upper spherical cap 1. The release cord 15'' may be attached at the spider point 15' of the shroud lines 15 (FIG. 1).

The radius $r_2$ of the lower cap 2 must be larger than the radius $r_1$ of the upper cap 1 and that in such a ratio as to make the vertical distance $h$ equal to about 1/6 of the diameter $d$ of the parachute.

In the lower cap 2 are provided numerous small air-inlet openings 3 and in the central area, i.e. at the vertex of the upper cap 1, one large opening 4 for air outlet.

The air-outlet area of the large opening 4 is adjustable. The controlling device may be designed at will. FIGURE 2 shows an example of such a controlling valve. The valve consists of a cone 5, which is open at its base, and a ring 6, surrounding the cone and rigidly fastened to the edge of the opening of the cap 1. Ribs 6' on the ring 6 prevent cone 5 from coming in touch with ring 6. Moreover, the ribs 6' serve as guides for the cone. The cone 5 is operated by a line 7. By pulling down line 7 against the pressure exerted on the cone 5 by the passing air, the gap between ring 6 and cone 5 will be enlarged.

The two co-axially situated spherical caps of different radii $r_1$ and $r_2$, arranged one above the other and tightly connected at the edges, form an expandable space 9 of crescent-shaped cross-section between them. The air under the unfolded parachute, compressed by the weight of the falling parachute, enters as jets the space between the caps 1 and 2 through the numerous nozzle shaped openings 3 in the lower cap 2. Thus the cap 1, originally resting on cap 2, is inflated like a balloon. The subsequently entering air is discharged through the large central opening 4 in the upper cap 1 as jet 8', giving a stabilizing effect to the parachute. It is evident that the combined action of the numerous air-inlet openings in the lower cap and of the one considerably larger central opening 4 in the upper cap effects much more precisely defined air-flow conditions than those obtained with conventional single-cap parachutes.

By this arrangement novel aerodynamic conditions are created. Independently of the air flow around the parachute, the air entering the space 9 through the nozzle-shaped openings in the lower cap 2 has supporting effect on the upper cap 2, while the air discharged through the upper central opening is likewise unaffected by the surrounding air-flow conditions. This guarantees that air arriving at the parachute even from a very slanting direction enters space 9 between the two caps 1 and 2, instead of flowing off along side the parachute, tilting same, as is the case with conventional single-cap parachutes. As a result, the double-cap parachute 1, 2 has much lower velocity of falling than a single-cap parachute.

The size of the central-air-outlet area determines the rate of fall of the parachute. The smaller the outlet area is made, the faster the parachute will drop, and vice verse. This may be due to the fact that, depending on the area of the opening 4, a greater or less resistance is offered to the air which has entered the space 9. If the resistance is rather large, the nozzle-shaped openings 3 in the lower cap 2 can allow only a small quantity of air to pass. Thus the air under the parachute not admitted to space 9 flows off sideways, increasing thus the rate of fall. In the event of a larger area of opening 4, a greater amount of air can pass the nozzles 3 to be received by the space 9 and to be finally discharged through the outlet opening 4 in a predetermined way.

The openings 3 in the lower cap 2 are advantageously equipped with inserts 10 resembling a funnel-shaped nozzle as tube shown in FIG. 4. The tubes can be made from parachute silk, i.e. the same fabric as caps 1 and 2 are made from, and sewn to the edges of the openings 3. They can be made likewise of plastics, glued to the edges of the openings. It is of great importance that by means of the tubular extension 10' on the funnel-shaped part 10'' a nozzle effect is achieved. The number of inserts 10 and their distribution on the cap 2 depend on the diameter of the parachute and its purpose. Thus, the descent characteristics of the parachute can be determined in advance. For this purpose the openings in the lower cap may be for instance irregularly arranged in such a way that the total area of all nozzles situated in the vertex zone of the cap differs considerably from the total area of all nozzles situated near the periphery of the lower cap.

In order to secure and to accelerate the unfolding of the parachute out of the packing bag 11, an expanding device 13, e.g. a spring wire, is placed in the seam 12 formed by the edges 1' and 2'. This expanding device 13 does not interfere with the usual folding of the parachute. However, after the opening of the bag 11, it causes the rim 1', 2' of the parachute to unfold extremely fast and reliably.

The expanding device 13 placed in the seam 12 can also be in the shape of a tube for increased effectiveness. To this tube a compressed air bottle 14 or any other gas-pressure source can be connected by means of a connecting tube 13'. The embodiment illustrated by FIG. 1 shows how the gas-pressure source 14 remains in the packing bag 11 after the parachute has unfolded. From this figure it can be seen further that the connecting tube 13' is somewhat longer than shroud lines 15, in order to avoid tearing of this connection by the stretching shroud lines 15.

When the expanding device is a tube to be put under internal pressure by means of compressed gas, it will be advisable to leave the free ends of the tube open to enable the compressed gas to escape after having inflated the tube to tautness. A momentary inflation of the tube will suffice to bring about the desired expanding effect.

The dotted lines in FIG. 2 indicate that instead of a compressed-air bottle 14, connected by a tube 13' to the expanding hose in seam 12, a pressure source 14' can be arranged within the expanding tube 13.

It is evident that there are many constructional variations possible within the scope of the invention, e.g. by the provision in the upper cap 1 of radial hoses preferably closed at their free ends and connected to tube 13; thus particularly with big cargo parachutes reinforcing ribs are formed. Various constructional variations are also possible with regard to the controlling device for the upper air outlet 4.

What I claim is:

1. A parachute comprising a spreadable canopy with a multiplicity of air passages distributed over its surface, and a set of nozzles each extending through a respective one of said passages, each of said nozzles being funnel-shaped with a downwardly facing funnel mouth.

2. A parachute comprising two spreadable canopies including a lower canopy with a multiplicity of air passages distributed over its surface, an upper canopy overlying said lower canopy and secured to it at its periphery, and a set of nozzles each extending through a respective one of said passages, each of said nozzles being funnel-shaped with a downwardly facing funnel mouth, said upper canopy having a central air-escape aperture with a cross-sectional area less than the combined cross-sectional area of said nozzles.

3. A parachute according to claim 2 wherein said aperture is provided with valve means for controlling its cross-sectional area.

4. A parachute according to claim 3 wherein said valve means comprises a substantially conical plug member extending into said aperture from below and having a downwardly facing concavity exposed to relatively ascending air streams from certain of said nozzles.

5. A parachute according to claim 2 wherein said canopies in spread position are segments of spheres of different radii, the sphere of said lower canopy having the larger radius, said canopies forming between them a space of crescent-shaped cross-section.

6. A parachute according to claim 5 wherein said canopies have interconnected peripheries of like diameter, further comprising expandable spreading means disposed at said interconnected peripheries.

7. A parachute according to claim 6 wherein the maximum height of said space is substantially one-sixth of the diameter of said interconnected peripheries.

References Cited in the file of this patent

UNITED STATES PATENTS

| | | |
|---|---|---|
| 1,341,794 | El Vean | June 1, 1920 |
| 2,369,286 | De Lopez | Feb. 13, 1945 |
| 2,517,417 | Quilter | Aug. 1, 1950 |
| 2,644,656 | Zbock et al. | July 7, 1953 |
| 2,721,716 | Beadle | Oct. 25, 1955 |

FOREIGN PATENTS

| | | |
|---|---|---|
| 141,741 | Switzerland | Oct. 16, 1930 |
| 1,129,226 | France | Sept. 3, 1956 |